US009887816B2

(12) United States Patent
Rousu et al.

(10) Patent No.: US 9,887,816 B2
(45) Date of Patent: Feb. 6, 2018

(54) TRANSCEIVER RECONFIGURATION MECHANISM

(71) Applicant: AVAGO TECHNOLOGIES GENERAL IP (SINGAPORE) PTE. LTD., Singapore (SG)

(72) Inventors: Seppo Olavi Rousu, Oulu (FI); Antti Oskari Immonen, Helsinki (FI); Jouni Kristian Kaukovuori, Vantaa (FI)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 162 days.

(21) Appl. No.: 14/297,784

(22) Filed: Jun. 6, 2014

(65) Prior Publication Data
US 2014/0362824 A1 Dec. 11, 2014

(30) Foreign Application Priority Data

Jun. 7, 2013 (GB) .................................. 1310205.8

(51) Int. Cl.
G06F 11/00 (2006.01)
H04L 5/14 (2006.01)
H04B 7/00 (2006.01)
H04J 3/00 (2006.01)
H04L 5/00 (2006.01)
(Continued)

(52) U.S. Cl.
CPC ............ H04L 5/001 (2013.01); H04W 28/18 (2013.01); H04W 72/1284 (2013.01)

(58) Field of Classification Search
CPC .... H04L 5/001; H04W 28/18; H04W 72/1284
See application file for complete search history.

(56) References Cited

U.S. PATENT DOCUMENTS

2012/0287869 A1* 11/2012 Xi ........................... H04L 5/003
370/329
2013/0229931 A1* 9/2013 Kim ..................... H04W 24/10
370/252
(Continued)

FOREIGN PATENT DOCUMENTS

WO         2011040852        4/2011

OTHER PUBLICATIONS

3GPP TS 36.321, version 11.2.0. ;Technical Specification Group Radio Network; Evolved Universal Terrestrial Radio Access (E-UTRA) Medium Access Control 9MAC) Protocol Specification; Release 11; (56 pages).

(Continued)

*Primary Examiner* — Faruk Hamza
*Assistant Examiner* — Abu-Sayeed Haque
(74) *Attorney, Agent, or Firm* — Oblon, McClelland, Maier & Neustadt, L.L.P.

(57) ABSTRACT

Embodiments of the invention include a method and apparatus for causing transmission of a signal providing at least one information related to a requirement for a reconfiguration period in which a reconfiguration procedure for reconfiguring a setting of a transceiver system is conducted, receiving and processing a signal which includes information related to a decision whether or not a reconfiguration period is scheduled, and executing a reconfiguration procedure for the transceiver system on the basis of a result of the processing of the received information.

20 Claims, 9 Drawing Sheets

(51) Int. Cl.
*H04W 28/18* (2009.01)
*H04W 72/12* (2009.01)

(56) References Cited

U.S. PATENT DOCUMENTS

| | | | | |
|---|---|---|---|---|
| 2013/0303199 A1* | 11/2013 | Siomina | ................ | H04W 64/00 455/456.5 |
| 2013/0308686 A1* | 11/2013 | Dawid | .................. | H04L 1/0625 375/146 |
| 2014/0092824 A1* | 4/2014 | He | .................... | H04W 52/0258 370/329 |
| 2014/0321342 A1* | 10/2014 | Kalyanasundaram | ........................ | H04W 72/1205 370/311 |
| 2015/0057011 A1* | 2/2015 | Di Girolamo | .... | H04W 74/0808 455/454 |

OTHER PUBLICATIONS

3GPP TS 36.331, version 11.3.0; Technical Specification Group Radio Network; Evolved Universal Terrestrial Radio Access (E-UTRA) Radio Resource Control (RRC) Protocol Specification; Release 11; (344 pages).

3GPP TS 36.300, version 11.5.0; Technical Specification Group Radio Network; Evolved Universal Terrestrial Radio Access (E-UTRA) and Evolved Universal Terrestrial Radio Access Network (E-UTRAN); Overall Description; Stage 2; Release 11 (209 pages).

3GPP TS 36.101, version 11.4.0;Technical Specification Group Radio Network; Evolved Universal Terrestrial Radio Access (E-UTRA); User Equipment (UE) Radio Transmission and Reception; Release 11 (405 pages).

* cited by examiner

TRANSCEIVER RECONFIGURATION MECHANISM

FIELD OF THE INVENTION

The present invention relates to a mechanism for reconfiguring a transceiver system of a communication element, such as a user equipment. In particular, example versions of the disclosure are directed to apparatuses, methods and computer program products by means of which a reconfiguration procedure of a transceiver system can be improved, for example in a communication scenario with a multi radio or carrier aggregation usage.

BACKGROUND OF THE INVENTION

Prior art which is related to this technical field can e.g. be found in technical specifications according to 3GPP TS 36.321 (e.g. version 11.2.0), 3GPP TS 36.331 (e.g. version 11.3.0), 3GPP TS 36.300 (e.g. version 11.5.0) and 3GPP TS 36.101 (e.g. version 11.4.0).

The following meanings for the abbreviations used in this specification apply:
APE: application processor engine
BB: baseband
BS: base station
CA: carrier aggregation
CC: component carrier
CLTD: closed loop transmit diversity
CPC: continuous packet continuity
CPU: central processing unit
DCO: digitally controlled oscillator
DL: downlink
DRX: discontinuous reception
DSDA: dual SIM (subscriber identification module) dual active
DTX: discontinuous transmission
eNB: evolved node B
EUTRA: evolved universal terrestrial radio access
FDD: frequency division duplex
FE: front end
HB: higher band
HW: hardware
IC: integrated circuit
ID: identification
IL: insertion loss
LA: local area
LAeNB: LA eNB (eNB controlling LA cell)
LB: lower band
LNA: low noise amplifier
LO: local oscillator
LTE: Long Term Evolution
LTE-A: LTE Advanced
MAC: medium access control
MIMO: multiple input multiple output
MUX: multiplexer, multiplexing
PA: power amplifier
PCC: primary component carrier
Pcell: primary cell
PLL: phase locked loop
RAT: radio access technology
RF: radio frequency
RFIC: radio frequency integrated circuit
RX: receiver, reception
SCC: secondary component carrier
Scell: secondary cell
TPC: transmission power control
TX: transmitter, transmission
VCO: voltage controlled oscillator
UE: user equipment
UL: uplink In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

A new development of communication network systems is the implementation of heterogeneous networks consisting of e.g. a "normal" communication cell (referred to as macro cell) and plural small cells (referred to as Scells or local area (LA) cells) which allow a better coverage and possibly outsourcing options for communications conducted in the macro cell.

In carrier aggregation (CA), it is intended to increase communication data throughput by using simultaneous communication link with multiple carrier components (CC). For example, CA is done in DL direction with secondary CC (SCC). SCC may use an adjacent or non-adjacent frequency band with regard to the PCC. For example, an adjacent CC is related to a so-called intra-band CA case, while a non-adjacent CC may be related to a so-called inter-band CA (but is also usable in an intra-band CA). In addition, CC's can include several clusters that in practice mean that RB's in one CC can be allocated in non-contiguous manner. Also UL CA is considered for increasing data throughput further, e.g. in connection with relays or routers.

In protocol point of view, DL CA communication creation starts from an active primary cell (Pcell) communication link, which is always used for UL communication purposes in combination with DL CA. DL communication link/s from one or more secondary cell/s are then configured according to allocated radio resources. It is to be noted that prior to a Scell communication link establishment, a communication unit such as a UE using the CA communication may conduct Scell measurements and report results to a communication counterpart (e.g. the eNB). Furthermore, a Scell communication link may be disconnected after some period, e.g. when the UE detects that a Scell timer or the like in the UE reaches a limit which may be a value being predefined by the network.

When the UE is attached to the network, a so-called handover may take place e.g. due to mobility or load reasons. In such a handover, the Scell communication link is not kept active. The handover is executed from one Pcell communication resource (e.g. one eNB) to an alternate Pcell communication resource (e.g. another eNB) according to known handover procedures. In this situation, a new DL CA communication (with Scells) will be established as indicated above.

DETAILED DESCRIPTION

Figure 1:
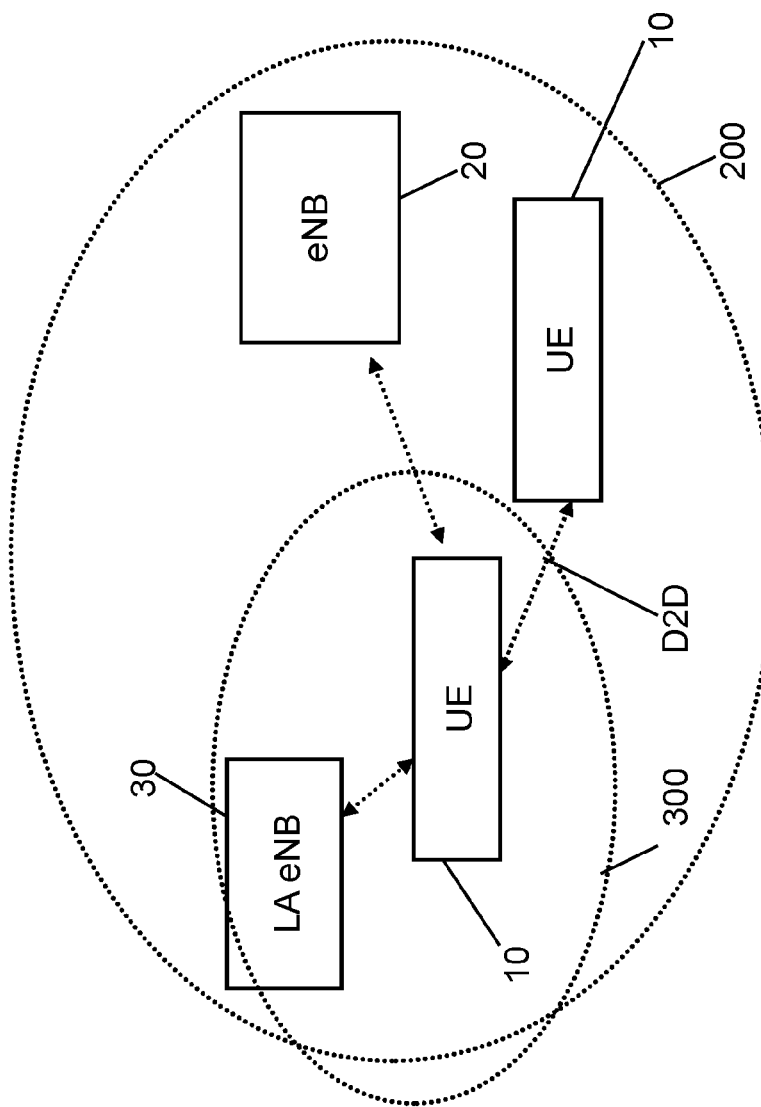
FIG. 1 shows a diagram illustrating a communication network configuration where some example versions of the disclosure are implemented.

Example versions of the disclosure provide an apparatus, method and computer program product by means of which an enhanced mechanism for reconfiguring a transceiver system of a communication element, such as a user equipment is provided. Specifically, according to some examples versions of the disclosure, apparatuses, methods and computer program products are provided by means of which a reconfiguration procedure of a transceiver system can be improved, for example in a communication scenario with a multi radio or carrier aggregation usage.

According to an example version of the disclosure, there is provided, for example, an apparatus comprising at least one processor; and at least one memory including computer program code; wherein the at least one memory and the computer program code are configured, with the at least one processor, to cause the apparatus at least to perform causing transmission of a signal providing at least one information related to a requirement for a reconfiguration period in which a reconfiguration procedure for reconfiguring a setting of a transceiver system is conducted, receiving and processing a signal comprising information related to a decision whether or not a reconfiguration period is scheduled, and executing a reconfiguration procedure for the transceiver system on the basis of a result of the processing of the received information.

Furthermore, according to an example version of the disclosure, there is provided, for example, a method comprising causing transmission of a signal providing at least one information related to a requirement for a reconfiguration period in which a reconfiguration procedure for reconfiguring a setting of a transceiver system is conducted, receiving and processing a signal comprising information related to a decision whether or not a reconfiguration period is scheduled, and executing a reconfiguration procedure for the transceiver system on the basis of a result of the processing of the received information.

In addition, according to an example version of the disclosure, there is provided, for example, an apparatus comprising at least one processor; and at least one memory including computer program code; wherein the at least one memory and the computer program code are configured, with the at least one processor, to cause the apparatus at least to perform receiving and processing a signal providing at least one information related to a requirement for a reconfiguration period in which a reconfiguration procedure for reconfiguring a setting of a transceiver system is conducted, deciding whether or not a reconfiguration period is to be scheduled, and causing a transmission of a signal including information related to the decision of whether or not a reconfiguration period is scheduled.

Furthermore, according to an example version of the disclosure, there is provided, for example, a method comprising receiving and processing a signal providing at least one information related to a requirement for a reconfiguration period in which a reconfiguration procedure for reconfiguring a setting of a transceiver system is conducted, deciding whether or not a reconfiguration period is to be scheduled, and causing a transmission of a signal including information related to the decision of whether or not a reconfiguration period is scheduled.

In addition, according to some example versions of the disclosure, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

The above and still further objects, features and advantages of the some embodiments of the invention will become more apparent upon referring to the description and the accompanying drawings.

In the following, example versions of the disclosure are described with reference to the drawings. For illustrating the present invention, some example versions of the disclosure will be described in connection with a cellular communication network based on a 3GPP LTE or LTE-A system wherein a heterogeneous network configuration comprising a macro cell controlled by a communication network control element, such as an eNB, and one or more small cells or LA cells located in the macro cell coverage area and constituted by a base station or transceiver element, such as an eNB (referred to hereinafter as local area eNB or LAeNB) is employed. However, it is to be noted that the present invention is not limited to an application using such types of communication systems, but is also applicable in other types of communication systems, such as a 3GPP based UMTS communication system, an LTE based communication system, a WCDMA system etc. Furthermore, instead of a communication using Pcell and Scell communication links, also a communication using the macro cell communication link and an alternate communication link (e.g. Bluetooth, WLAN etc.) is applicable.

A basic system architecture of a communication network where example versions of the disclosure are applicable may comprise a commonly known architecture of one or more communication systems comprising a wired or wireless access network subsystem and a core network. Such an architecture may comprise one or more access network control elements, radio access network elements, access service network gateways or base transceiver stations, such as a base station or eNB, which control a coverage area also referred to as a (macro or LA) cell and with which a communication element or terminal device such as a UE or another device having a similar function, such as a modem chipset, a chip, a module etc., which can also be part of a UE or attached as a separate element to a UE, or the like, is capable to communicate via one or more links, bearers, channels etc. for transmitting several types of data. Furthermore, core network elements such as gateway network elements, policy and charging control network elements, mobility management entities and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling connections may be employed for a communication to or from a communication element like a UE or a communication network control element like an eNB etc., besides those described in detail herein below.

Furthermore, the described network elements, such as communication elements like UEs, communication network control elements like base stations, access nodes, eNBs, and the like, as well as corresponding functions as described herein may be implemented by software, e.g. by a computer program product for a computer, and/or by hardware. In any case, for executing their respective functions and/or algorithms, correspondingly used devices, nodes or network elements may comprise several means and components (not shown) which are required for control, processing and communication/signaling functionality. Such means may comprise, for example, one or more processor units including one or more processing portions for executing instructions, programs and for processing data, memory means for storing instructions, programs and data, for serving as a work area of the processor or processing portion and the like (e.g. ROM, RAM, EEPROM, and the like), input means for inputting data and instructions by software (e.g. floppy disc, CD-ROM, EEPROM, and the like), user interface means for providing monitor and manipulation possibilities to a user (e.g. a screen, a keyboard and the like), interface means for establishing links and/or connections under the control of the processor unit or portion (e.g. wired and wireless interface means, an antenna, etc.) and the like. It is to be noted that in the present specification processing portions should not be only considered to represent physical portions of one or more processors, but may also be considered as a logical division of the referred processing tasks performed by one or more processors.

With regard to FIG. 1, a diagram is shown illustrating a communication network configuration where some example versions of the disclosure may be implemented. It is to be noted that the configuration indicated in FIG. 1 shows only those devices, network elements and parts which are useful for understanding principles underlying some example versions of the disclosure. As also known by those skilled in the art there may be several other network elements or devices involved in a connection between the communication element (UE) and the network (i.e. the communication network control element or eNB and/or the core network) which are omitted here for the sake of simplicity.

In FIG. 1, a communication network configuration is illustrated in which some example versions of the disclosure are implementable. The network according to FIG. 1 is for example based on 3GPP LTE or LTE-A specifications and forms a heterogeneous network including a primary serving cell (macro cell or Pcell) and one or more small cells (LA cells or Scells, only one is shown in FIG. 1). It is to be noted that the general functions of the elements described in connection with FIG. 1 as well as of reference points/interfaces there between are known to those skilled in the art so that a detailed description thereof is omitted here for the sake of simplicity.

As shown in FIG. 1, in the exemplary communication network, a macro cell 200 is formed by a macro cell controller, i.e. by a communication network control element such as eNB 20. The eNB 20 provides, for example, a connection to a core network of the communication network. In the following, it is assumed that the macro cell represents the primary cell for communication links.

In the macro cell 200, one or more small cells or LA cells 300 are located. Each small cell is controlled by an own communication network control element, such as LAeNB 30. In the example of FIG. 1, one LA cell is depicted, but the number is not limited thereto and can be greater than one. In the following, it is assumed that the small cell 300 represent the secondary cell for communication links.

As further shown in FIG. 1, a communication element or terminal device UE 10 is located in the communication network so as to be able to establish simultaneously a connection or communication link towards the macro cell (i.e. Pcell controlled by the eNB 20) and a connection or communication link towards the small cell (i.e. Scell controlled by the LAeNB 30), so as to communicate in a multi communication mode. That is, the UE 10 is configured to communicate with the network via the eNB 20 and the LAeNB 30 by using, for example, carrier aggregation or multi radio functions.

Also shown in FIG. 1 is a further communication element or UE 15. According to some example versions of the disclosure, it is assumed that the UE 10 and the UE 15 are able to communicate directly with each other, which is also referred to as device to device (D2D) communication.

It is to be expected that various UE implementation for CA creation will be presented according to architectures for different CA combinations. For example, UE implementations may comprise one or more of e.g. RF FE, RFIC with path selection switches and synthesizers, and RF-BB MUX circuitries.

Figure 2:
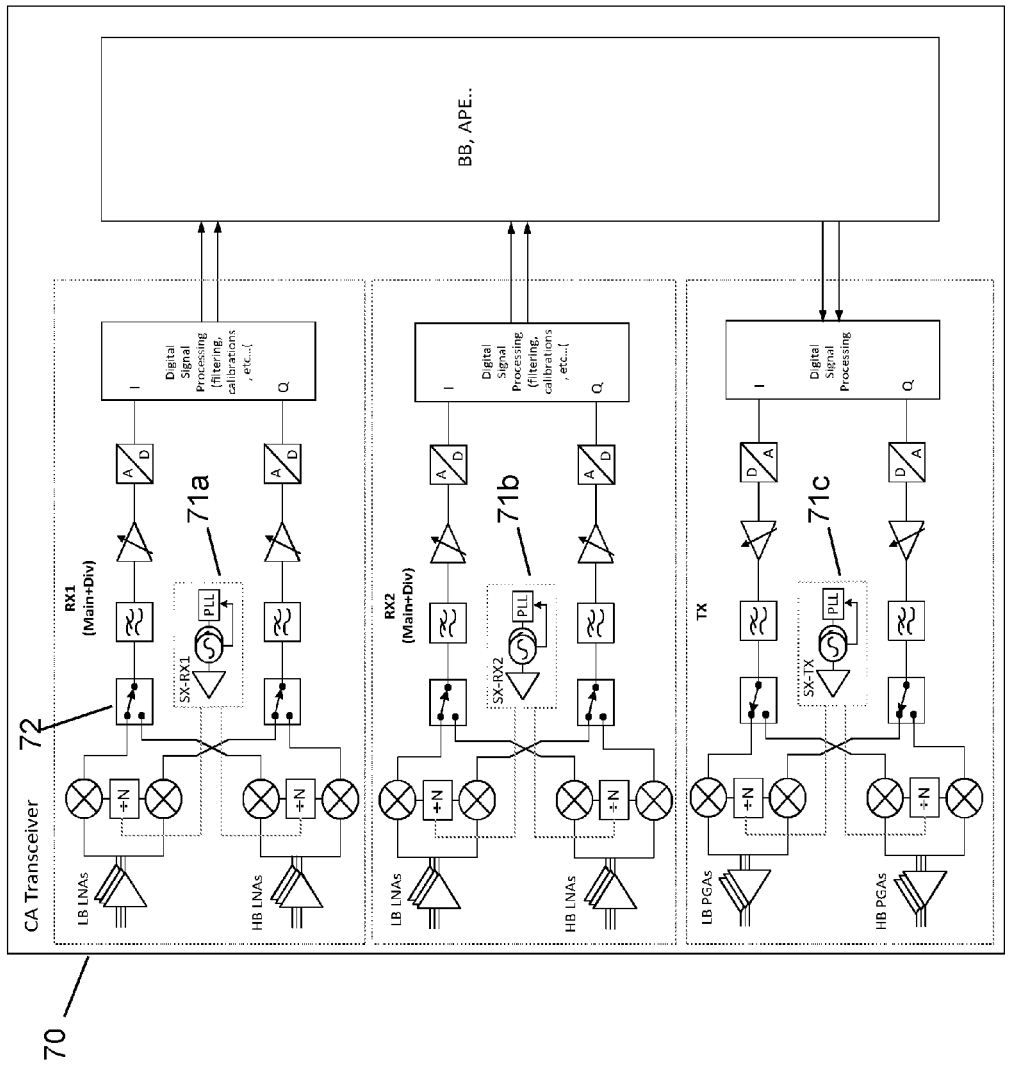
FIG. 2 shows a diagram illustrating a configuration of a transceiver system where some example versions of the disclosure may be implemented.

In FIG. 2, a diagram illustrating a configuration of a transceiver system where some example versions of the disclosure may be implemented is shown. Specifically, FIG. 2 shows a diagram of a transceiver system 70 being capable of conducting a communication using CA, i.e. a multi-input/output configurable receiver.

The topology shown in FIG. 2 represents a simplified topology of transceiver system 70 which is able to support communications with multiple carriers on multiple bands. According to the example shown in FIG. 2, there are provided two receiver parts or modules RX1 and RX2 which are both able to receive communications via a main antenna and a diversity antenna (not shown). Furthermore, a transmitter part or module TX is provided. Even though the example illustrated in FIG. 2 comprises only one TX and two RX, it is to be noted that other examples may comprise plural TX and/or one or more than two RX. For example, in case of UL CA, e.g. in an UL inter-band CA case or an UL intra-band non-contiguous CA, (at least) two TX chains are required and used correspondingly. Alternatively or additionally, more than two RX chains are possible. This leads then, of course, to a further increase of required interfering components, such as oscillators (DCO) or the like.

Referring e.g. to RX1, there are plural LNA input stages dedicated to support low-bands (LB), and plural LNA input stages dedicated to support high-bands (HB). It is to be noted that in the configuration illustrated in FIG. 2, the division into LB and HB is exemplary only. According to further example versions of the disclosure, there may be more dedicated areas, e.g. very high band for 3.5-GHz bands or very low bands for 450 . . . 600 Mhz, for example. Furthermore, a wideband-load may be applied to cover all or most of the bands with a single design.

The carrier signal from an active input is guided via signal paths for I and Q branches to respective mixer cores which are connected to SX stages having a respective oscillator unit, e.g. a DCO 71a (reference signs 71b and 71c are related to oscillator units of RX2 and TX). RF switches 72 a connected to the outputs of the mixers for switching between LB and HB carriers for I or Q branches. After passing a low pass filter and an amplifier, analog to digital conversion is done in an A/D element, whereupon the signals are forwarded to a digital signal processing unit where functions like filtering, calibration etc. may be conducted. After the digital signal processing, the processed signals are forwarded to a BB/APE element. As derivable from FIG. 2, the signal path is the other way around in case of transmission (i.e. for TX).

Figure 3:
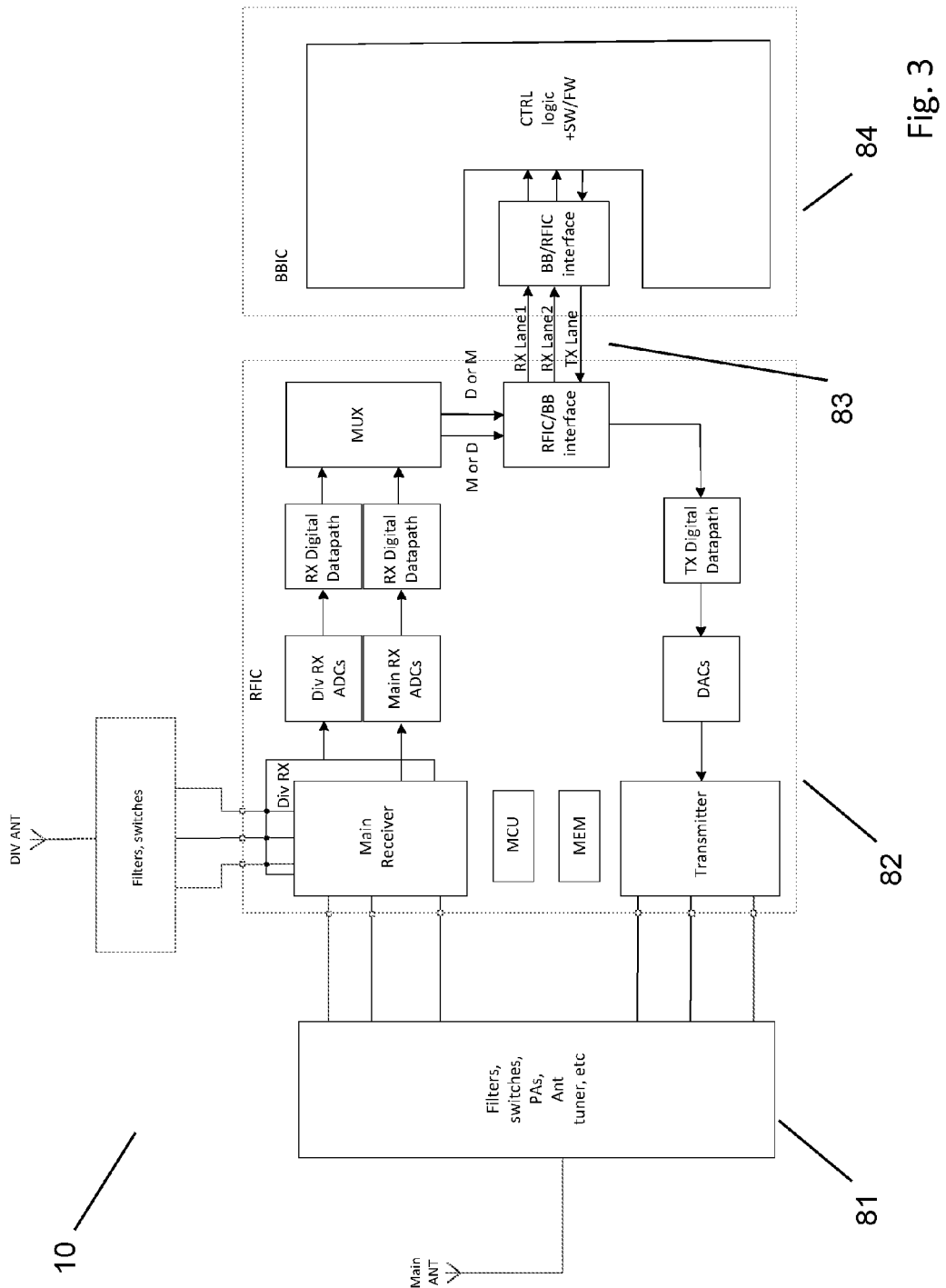
FIG. 3 shows a diagram illustrating a configuration of a communication element where some example versions of the disclosure may be implemented.

FIG. 3 shows a diagram illustrating a configuration of a communication element where some example versions of the disclosure may be implemented. Specifically, FIG. 3 shows a diagram illustrating a structure of a receiver/transmitter path in a communication element such as a UE being capable of conducting a CA based communication, for example.

As shown in FIG. 3, a receiver/transmitter path may comprise a main antenna and a diversity antenna which are connected to respective antenna interface and RF FE unit 81 comprising e.g. filters, switches, PAs, an antenna tuner etc. A RFIC 82 is connected to the respective antenna interface and RF FE unit 81 and comprises respective receiver units for the main and the diversity antennas, a transmitter unit, digital-to-analog and analog-to-digital converters (ADCs, DACs), a master control unit (MCU), a memory (MEM), a multiplexer for the RX datapaths, and a radio-frequency/baseband interface (RF/BB IF) 83, which comprises an interface part at the RFIC and an interface part at a BBIC 84. The BBIC 84 may comprise a control logic incorporating software (SW) and/or firmware (FW).

Other examples for configurations of communication elements, transceiver systems etc. are also conceivable as further implementation examples where example versions of the disclosure may be applied. For example, receiver/transmitter path structures including e.g. switch/es in series, switch/es in parallel, filter/s, duplexer/s, diplexer/s, frequency response and/or phase controllable filter/s, frequency response and/or phase controllable duplexer/s, frequency response and/or phase controllable diplexer/s, active/passive matching element/s, power detector/s, couplers, automatic gain control/s, isolator/s, or the like may be used between the antenna and the BBIC. Furthermore, the number of antenna radiators and/or RFICs may vary according to implementation.

However, in transceiver systems like those described in connection with FIGS. 2 and 3, discontinuity in transmission or reception may occur, for example, due to a necessity to execute a reconfiguration of an operation mode (e.g. an SX frequency plan or the like). It is to be noted that similar problems arise also in other transceiver systems than this indicated in FIGS. 2 and 3, so that these configurations are to be understood only as illustrative example versions of the disclosure.

For example, in some radio architectures and operational use cases, discontinuity in transmission and reception may occur due to RF-BB interface multiplexing operations, effects caused by a synthesizer arrangement and effects caused by switches (switching operations) in RF FE and RFIC signal paths, which is in particular the case when an activation and/or deactivation of an alternate communication link (Scell communication link in CA, WLAN link etc. in multi radio use cases) is executed.

For example, effects related to an activation of a communication link (e.g. Scell or alternate link) may result from an RF switch (e.g. element 72 in FIG. 2) state change which impacts communication link quality and reliability. Corresponding RF switch changes take place, for example, in measurements of Scell communications, in an activation of a Scell communication link, in measurements of an alternate RAT, in an activation of an alternate RAT communication link. Further effects related to an activation of a communication link (e.g. Scell or alternate link) may result from a VCO pulling and coupling which can degrade the DL performance of both PCC and SCC.

On the other hand, a network scheduler (i.e. the eNB side) does not have any information when an RF switch status is changed in the UE 10. However, a switch status change may impact the UL TX power. For example, the UE has to stop powering the TX for a switching period. Thus, from the network point of view (i.e. the eNB), a UE switch status change is comparable to fading. Hence, the network may command the UE to rise the TX power in UL direction by using TPC commands, but the UE may not be able to transmit. This may result in a corruption of channel estimates on the eNB side, and also next coming retransmissions may fail for some period. Another issue it that UE RX signal level may drop corresponding to a switch IL, which degrades the DL performance.

The UE may need to reconfigure the RF-BB interface (see FIG. 3, element 83), e.g. with MUX circuitry in an activation of a Scell or multi radio communication link. This causes however also discontinuity in the transmission/reception due to MUX delay/guard period and modem adaptation to a new channel. For example, in some CA implementation, a corresponding RF-BB MUX circuitry reconfiguration and modem restart may be required.

On the other hand, as indicated above, also effects related to a deactivation of a communication link (e.g. Scell or alternate link) are to be considered. For example, an RF switch state change impacts communication link quality and reliability like in the activation case. In case a switch status change is delayed, the UE is impacted due to additional power consumption due to extra insertion loss in the FE unit. Furthermore, while the UE may be able to switch off a power for alternate synthesizer without causing significant problems, this is not always possible without using pushing and pulling, which impacts remaining communication link quality.

Furthermore, the network scheduler (i.e. the eNB side) does not have any information when an alternate radio (multi radio) use case is ended. The UE is impacted by additional power consumption due to extra IL in the FE unit.

According to a comparative example, the UE autonomously executes a reconfiguration after a Scell timer has ended. However, the UE does not have exact reliable information when the reconfiguration is to be done. A delayed reconfiguration impacts the UE due to additional power consumption in the UE.

Moreover, the UE may require a reconfiguration of the RF-BB interface (single RFIC, two or more RFIC architecture) e.g. with MUX circuitry in case of a deactivation of Scell communication link or multi radio communication link or Pcell operation in alternate RFIC, which causes discontinuity in transmission/reception due to MUX delay/guard period and modem adaptation to new channel.

Referring to FIG. 2, effects caused by oscillator coupling are described. Transceiver systems may comprise RFICs. An RFIC may comprise at least two DCO/VCO cores (see e.g. reference signs 71$a$, 71$b$, 71$c$), since in FDD systems receiver and transmitter operate at different center frequencies. Typically, a final LO signal with quadrature phases (I and Q) are processed with frequency dividers ($\div$N), for example $2^n$-dividers (also odd and fractional dividers may be used, but typically they lead to higher complexity, higher power consumption and poorer spurious tone performance). When two LO synthesizers operate at frequencies being close to each other, they may suffer from LO pulling, which may lead to an increased phase noise, instability, presence of sideband tones, etc. In a single-carrier (SC) FDD system, two simultaneously operating DCOs are not problematic since due to the duplex offset frequency the two oscillators do not operate at frequencies being close to each other.

However, in a CA-capable transceiver system, as indicated in FIG. 2, there are at least three SXs units 71$a$, 71$b$, 71$c$. However, when there are three oscillators running at the same time, there is a possibility that the DCOs of the two RX branches (RX1 and RX2) operate at frequencies being close to each other, or that the DCO of either of the RX branches (RX1 or RX2) and the TX branch operate at frequencies being close to each other.

According to a comparative example, in both of the above cases, overlapping DCOs may be avoided by modifying the SX frequency plan e.g. when a CA communication (reception) starts. There is required a certain amount of time for reconfiguring e.g. synthesizer(s), and a modem needs to find synchronization and adapt to communication channels. However, there is no a priori information when a CA reception starts or when a switching from Pcell to Scell happens. Therefore, it is possible that there are at least some missed slots during reception, leading to discontinuity and a need for retransmission. According to some comparative examples, it is proposed to consider an interruption in the communication processing of e.g. 1-2 ms, after an SCell is configured.

Referring to the example indicated in FIG. 3, further effects are caused by discontinuity impacted to communication signals when an RF switch or an RF-BB interface MUX changes state.

Network cells with different frequencies may not cover equal areas. When implementing CA, this may result in that activation/deactivation of Scells as well as handovers have to be done continuously during mobility phases of the UE. Furthermore, due to mobility, it is practically impossible to predict next operational conditions of communication links. An activation/deactivation in case of a DSDA system lead to comparable problems for the network performance.

One reason is related to CA RF/DSDA front end architectures and in general to a case where the RF front end is shared by different RATs. The number of aggregated bands and/or the number of simultaneously communicating RAT define a RF front end solution with a corresponding number of antenna interfaces. Some CA combinations may be done with an RF FE without RF switches or switching circuits. However, when a RF FE solution for CA and/or e.g. DSDA implements RF switches, certain effects cannot be avoided.

According to some approaches, LB-HB RF FE implementations for CA and multi active radios are favorable to combine with a diplexer wherein also a combination with switches may be used for example to provide bypass option to avoid the diplexer and the IL caused thereby. This requires however a decrease in the TX power or a power off state when doing switching. This will impact UL and DL retransmissions.

Switch related problems may arise with LB-HB, LB-LB and HB-HB RF FE implementations for CA and multi active radios. Due to narrow frequency separation, it is not possible to combine these pairs with a diplexer. According to comparative examples, a combination of two duplexers as quadplexer may be used, but this will lead to a high IL. This IL is a penalty when filter is used as in a non-aggregated use case or in CA use in an alternate CA combination. Additional IL is known to be visible in cell coverage, power consumption, power dissipation, data rate. To avoid the above aggregated bands, filters may be combined together with a switch or a switching arrangement. By this way, additional insertion IL in non-aggregated operational mode is avoided. Matching network IL will be present in both use cases. However, in an operational mode change before switching, it is necessary to decrease a TX power to satisfy spurious emissions and to avoid RF FE component damages or stresses. After the switch state change, the TX power has to be set to target level step by step to keep spurious effects in tolerable margins. However, when the switch changes its state, a DL signal is impacted by causing a signal level drop of about 25 dB at approximately 100 μs duration (25 dB is a typical OFF state IL loss of RF switches).

However, the above measures are not applicable at each system. Therefore, network UL and DL capacity is further loaded due to retransmissions being required.

Furthermore, as indicated above, also the network scheduler (e.g. in the eNB) does not have any information when an alternate radio (multi radio) use case is started/ended (activation or deactivation caused e.g. by operator of alternate RAT or by device to device communication). On the other hand, the UE is not aware when there will be inactivity period in a first communication link which would allow the UE to execute a reconfiguration procedure.

That is, it may become necessary to provide a certain amount of time or period, which is referred to hereinafter also as UE reconfiguration period, which is required for performing a reconfiguration of a transceiver system, e.g. of a RF front end, in certain configuration cycles, or in some cases for arranging synthesizers settings. For example, RF front end configuration is required when the RF front end configuration comprises switches, e.g. in connection with LB+LB combinations and HB+HB combinations, but also with LB+HB CA use cases when the HW has e.g. two bands in one. Furthermore, also situations where a Scell measurement is conducted (e.g. with a 160 ms time interval) may require a UE reconfiguration period.

Furthermore, it is to be considered that in case the FE is continuously configured for CA, then there is continuously an additional IL present in the RF FE, which may lead to a power consumption and operational cell range penalty. Moreover, in case the FE is configured without network control, several retransmissions per UE may be required.

Consequently, according to some example versions of the disclosure, a mechanism regarding UE reconfiguration period is provided which allows to avoid an uncontrolled discontinuity in transmission or reception as it allows for a controlled reconfiguration period for reconfiguring e.g. a terminal operation mode (e.g. the SX frequency plan).

For this purpose, according to some example versions of the disclosure, the UE 10 specifically sends information to the network (e.g. the eNB 20), for example a specific request or reconfiguration capability information, which is related to a UE reconfiguration period. The network (eNB 20) is then able to schedule a reconfiguration period for the UE 10 on the basis of this information. In other words, the UE informs the eNB about a reconfiguration need at the terminal device (UE) wherein correspondingly provided information is used by the eNB to schedule a reconfiguration period for UE according to the need. According to some example versions of the disclosure, it is also possible to variably indicate the required duration of the reconfiguration period, e.g. by indicating a number of needed (predetermined) reconfiguration periods (i.e. the length of a required time for the reconfiguration procedure).

Figure 4:
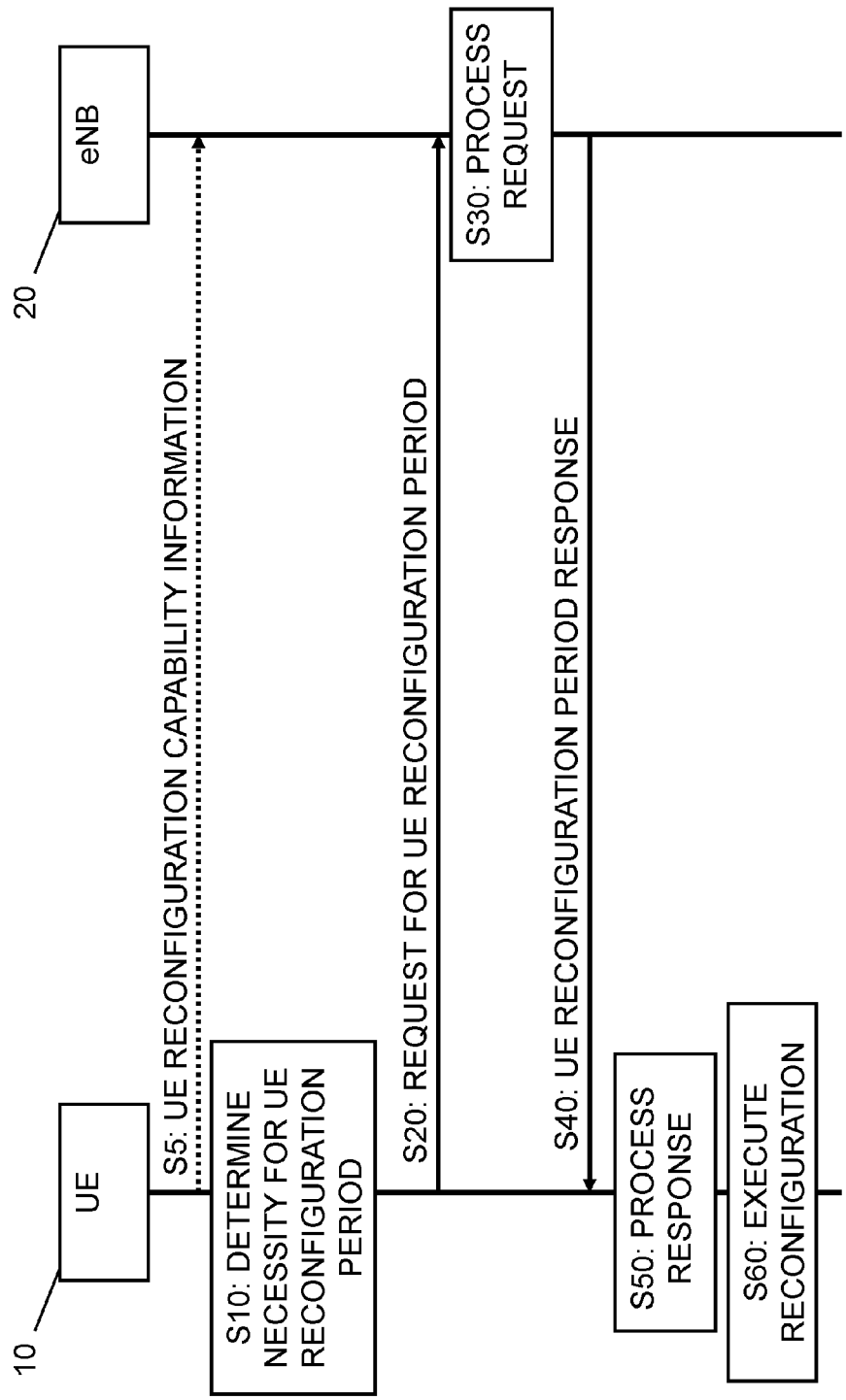
FIG. 4 shows a signaling diagram illustrating a mechanism usable in a reconfiguration processing according to an example version of the disclosure.

FIG. 4 shows a signaling diagram illustrating a mechanism usable in a reconfiguration processing according to an example version of the disclosure.

In S10, the UE 10 determines a necessity for a UE reconfiguration period. Due to this, in S20, the UE 10 request at the communication network control element (e.g. eNB 20) a UE reconfiguration period for a network scheduler or a communication counterpart. For example, the request may be sent in connection with a MAC control element to the eNB 20.

The necessity for a UE reconfiguration period is determined, for example, when at least one of the following states/conditions is detected: a deactivation of a Scell or a Scell communication link, an activation of a multi radio use case, a deactivation of the multi radio use case, an activation of a Pcell, a CLTD mode change (this may require antenna change with RF switch), UL and/or DL MIMO mode change, antenna system change, change of terminal mechanical form factor (to be described later).

It is to be noted that in connection with the request in S20 or at a previous state (e.g. at an establishment of a communication link), the UE 10 sends in S5 UE reconfiguration capability information which will be described later in connection with FIG. 5. The signaling in S5 is in the present example version of the disclosure an optional measure. That is, the processing conducted in the eNB 20 (described later) may use the UE reconfiguration capability information, if provided, or may work without this information.

In addition, even not explicitly shown in FIG. 4, the procedure comprises according to some example versions of the disclosure a further exchange of information for defining a duration of the required reconfiguration period. For example, the UE 10 may signal in connection with the request in S20 an information related to the duration of the reconfiguration period, such as a required number of predetermined reconfiguration period parts, e.g. N×1 ms, or an indication related to a predefined standard agreed value (e.g. 2 ms). Alternatively, after having received the request, the eNB 20 may send a request to the UE 10 for indicating the duration of the required reconfiguration period, e.g. a required number of predetermined reconfiguration period parts, e.g. N×1 ms, or the like. This request may then responded by the UE 10 accordingly.

In S30, the eNB 20 processes the request of S20 and possible additional information (UE reconfiguration capability information, duration information) and decides whether a reconfiguration period it to be scheduled or not. For example, a network scheduler schedules for UE reconfiguration period according to the UE reconfiguration capability information and/or further changed information. In this context, it is checked whether a UE reconfiguration period is required for some reason (e.g. reasons indicated above with regard to the reasons why the UE 10 sends the request in S20), the Pcell needs a reconfiguration period for some reason, or a Scell needs a reconfiguration period for some reason.

In S40, the eNB 20 sends to the UE 10 a reply to the request message in S20. In this reply message, the decision regarding the UE reconfiguration period is indicated. For example, when the decision is that the UE reconfiguration period is scheduled, the message in S40 comprises information for indicating the scheduled UE reconfiguration period, e.g. in the form of an inactivity period measurement cap, a CPC, DTX/DRX or alternate special purpose UE reconfiguration period. Otherwise, in case the UE reconfiguration period is not scheduled, the message in S40 comprises information related to a rejection of the request in S20.

In S50, the UE 10 processes the received response message and determines whether the network has scheduled a UE reconfiguration period. Then, in S60, the UE 10 executes a reconfiguration procedure depending on the result of the processing of S50, i.e. depending on whether the UE reconfiguration period is scheduled or not by the network.

If the UE reconfiguration period is scheduled, the UE executes a reconfiguration procedure in accordance with the scheduled UE reconfiguration period, i.e. during a time indicated by the UE reconfiguration period.

Otherwise, in case the UE reconfiguration period is decided to be not scheduled by the network, the UE 10 performs another processing. The network scheduler may reject the request for the UE reconfiguration period for some reasons, wherein in this case the UE 10 may decide to do the reconfiguration independently, i.e. to schedule a UE reconfiguration period independently when other circumstances allow this (e.g. when communication link conditions allows). In other words, according to some example versions of the disclosure, the UE 10 has a fall-back position in case the network does not schedule a UE reconfiguration period.

That is, in case the network scheduler rejects the request to schedule a UE reconfiguration period, which is determined in S50 e.g. on the basis of the rejection indication, the UE 10 checks in S60 whether an independent reconfiguration procedure is possible, and if this is the case, conducts this independent reconfiguration procedure. For example, the UE 10 executes the independent reconfiguration procedure on the basis of communication link related information. This concerns, for example, that a reconfiguration may be done after a Scell deactivation counter reaches a predefined value. Alternatively, a reconfiguration may be done after the Scell deactivation counter reaches the predefined value, and on the basis of a PCell communication link timing related information (e.g. immediately after the Scell deactivation counter has reached the predefined value, or after a predefined delay after the Scell deactivation counter has reached the predefined value). PCell communication link timing related information may be related to at least one of a measurement gap, a handover, CPC, DTX, DRX, Voice over LTE inactivity slot, prefix period(s), TX or RX inactivity period, operational antenna change period CLTD. Furthermore, communication link related information for the above mentioned purpose may relate to an activation or deactivation of a multi radio use case, UL and/or DL MIMO mode change, antenna system change, change of terminal mechanical form factor.

When the check that the independent reconfiguration procedure is possible is positive, the UE 10 schedules a UE reconfiguration period on the basis of predetermined criteria related to a communication condition or a processing condition. For example, criteria to select a timing for the reconfiguration may comprise at least one of a determination that UL payload data is not corrupted/blanked, DL payload data is not corrupted/blanked, UL control data is not corrupted/blanked, DL control data is not corrupted/blanked, UE power consumption saving, a status of running applications, a status of emergency call, a status of positioning, and the like.

When executing the independent reconfiguration procedure, the UE executes the reconfiguration during the reconfiguration period scheduled by UE in S60.

Figure 5:
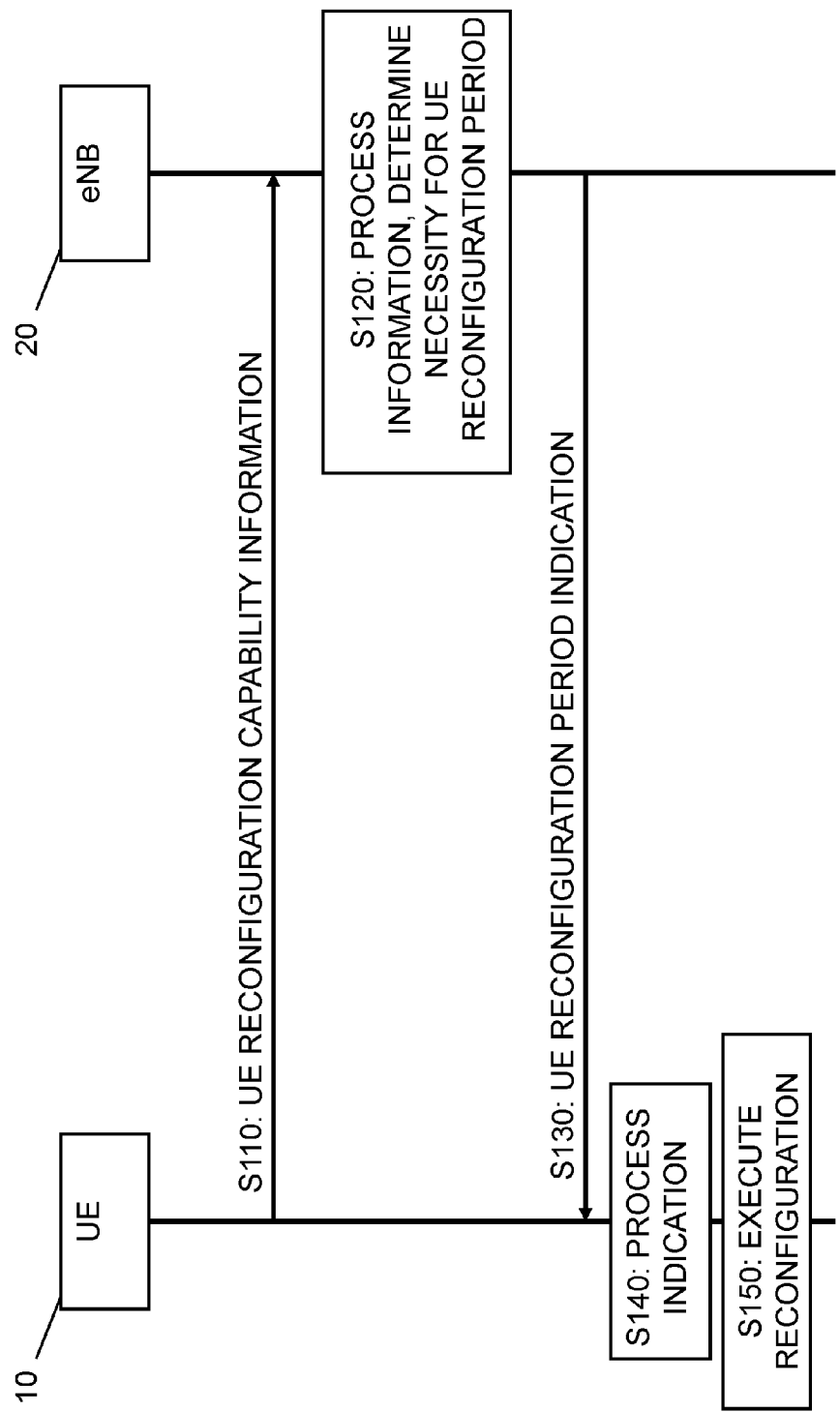
FIG. 5 shows a signaling diagram illustrating a mechanism usable in a reconfiguration processing according to an example version of the disclosure.

FIG. 5 shows a signaling diagram illustrating a further mechanism usable in a reconfiguration processing according to an example version of the disclosure.

In S110, the UE 10 sends to the communication network control element (e.g. the eNB 20) information regarding UE reconfiguration capability. For example, the UE reconfiguration capability information is embedded in UE configuration information which the UE 10 signals to the network. One example is to use for the UE reconfiguration capability information CA combination information (described below), but also other applications are possible, for example a separate signaling, or the like. The UE reconfiguration capability information may contain at least one of the following options: the UE does not need a HW reconfiguration period, the UE needs a HW reconfiguration period for some reason, the Pcell needs a reconfiguration period for some reason, and a Scell needs reconfiguration period for some reason.

In S120, the network (e.g. the eNB 20) processes the information received in S110 and determines whether there is a necessity for a UE reconfiguration period. That is, the eNB 20 may schedule the UE reconfiguration period if required by the UE reconfiguration capability.

The network scheduler schedules the UE reconfiguration period for the UE, for example, in case of measurements of Scells, when the UE capability information requires this, or at an activation/deactivation/reconfiguration of SCells, when the UE capability information requires this.

In addition, even not explicitly shown in FIG. 5, the procedure comprises according to some example versions of the disclosure a further exchange of information for defining a duration of the required reconfiguration period. For example, the UE 10 may signal in connection with S110 an information related to the duration of the reconfiguration period, such as a required number of predetermined reconfiguration period parts, e.g. N×1 ms, or an indication related to a predefined standard agreed value (e.g. 2 ms). Alternatively, in connection with S120, the eNB 20 may send a request to the UE 10 for indicating the duration of the required reconfiguration period, e.g. a required number of predetermined reconfiguration period parts, e.g. N×1 ms, or the like. This request may then be responded by the UE 10 accordingly.

In case the decision in S120 is positive, i.e. a UE reconfiguration period is to be scheduled, the eNB 20 sends in S130 an indication regarding the UE reconfiguration period being scheduled to the UE 10.

Otherwise, if the UE 10 does not need a reconfiguration period, i.e. in case the decision in S120 is negative, the network may schedule a UE payload period.

In S140, the UE 10 receives the indication regarding the scheduled UE reconfiguration period and executes in S150 a corresponding reconfiguration procedure, wherein the reconfiguration is executed during the reconfiguration period scheduled by the eNB.

That is, in the example version of the disclosure as described in FIG. 5, according to a UE reconfiguration capability information, the network scheduler schedules for a UE reconfiguration period, wherein the UE capability information and further changed information are considered. If the UE reconfiguration period is not scheduled, the network scheduler uses the period for payload. According to some example versions of the disclosure, this may vary according to a UE architecture solution for each CA use case. As a matter of course, the network scheduler does not allocate any UL or DL traffic during the duration of the UE reconfiguration period.

In the following, a possible implementation for providing the UE reconfiguration capability information in connection with UE configuration information according to some example versions of the disclosure is described. For example, the capability related information may be included to UE E-UTRA CA configuration information. An example of the UE E-UTRA CA configuration information is indicated in Table 1.

TABLE 1

E-UTRA CA configurations and bandwidth combination sets defined for inter-band CA
E-UTRA CA configuration/Bandwidth combination set

| E-UTRA CA Configuration | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|
| CA_1A-5A | 1 |  |  | Yes |  |  |  | 20 | 0 |
|  | 5 |  |  | Yes |  |  |  |  |  |
| CA_1A-18A | 1 |  | Yes | Yes | Yes | Yes |  | 35 | 0 |
|  | 18 |  | Yes | Yes | Yes |  |  |  |  |
| CA_1A-19A | 1 |  | Yes | Yes | Yes | Yes |  | 35 | 0 |
|  | 19 |  | Yes | Yes | Yes |  |  |  |  |
| CA_1A-21A | 1 |  | Yes | Yes | Yes | Yes |  | 35 | 0 |
|  | 21 |  | Yes | Yes | Yes |  |  |  |  |

TABLE 1-continued

E-UTRA CA configurations and bandwidth combination sets defined for inter-band CA
E-UTRA CA configuration/Bandwidth combination set

| E-UTRA CA Configuration | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|
| CA_2A-17A | 2 |  |  | Yes | Yes |  |  | 20 | 0 |
|  | 17 |  |  | Yes | Yes |  |  |  |  |
| CA_2A-29A | 2 |  |  | Yes | Yes |  |  | 20 | 0 |
|  | 29 |  | Yes | Yes | Yes |  |  |  |  |
| CA_3A-5A | 3 |  |  | Yes | Yes | Yes | Yes | 30 | 0 |
|  | 5 |  |  | Yes | Yes |  |  |  |  |
|  | 3 |  |  |  | Yes |  |  | 20 | 1 |
|  | 5 |  |  | Yes | Yes |  |  |  |  |
| CA_3A-7A | 3 |  |  | Yes | Yes | Yes | Yes | 40 | 0 |
|  | 7 |  |  |  | Yes | Yes | Yes |  |  |
| CA_3A-8A | 3 |  |  | Yes | Yes | Yes |  | 30 | 0 |
|  | 8 |  |  | Yes | Yes |  |  |  |  |
|  | 3 |  |  |  | Yes |  |  | 20 | 1 |
|  | 8 |  |  | Yes | Yes |  |  |  |  |
| CA_3A-20A | 3 |  |  | Yes | Yes | Yes | Yes | 30 | 0 |
|  | 20 |  |  | Yes | Yes |  |  |  |  |
| CA_4A-5A | 4 |  |  | Yes | Yes |  |  | 20 | 0 |
|  | 5 |  |  | Yes | Yes |  |  |  |  |
| CA_4A-7A | 4 |  |  | Yes | Yes |  |  | 30 | 0 |
|  | 7 |  |  | Yes | Yes | Yes | Yes |  |  |
| CA_4A-12A | 4 | Yes | Yes | Yes | Yes |  |  | 20 | 0 |
|  | 12 |  |  | Yes | Yes |  |  |  |  |
| CA_4A-13A | 4 |  |  | Yes | Yes | Yes | Yes | 30 | 0 |
|  | 13 |  |  |  | Yes |  |  |  |  |
|  | 4 |  |  | Yes | Yes |  |  | 20 | 1 |
|  | 13 |  |  |  | Yes |  |  |  |  |
| CA_4A-17A | 4 |  |  | Yes | Yes |  |  | 20 | 0 |
|  | 17 |  |  | Yes | Yes |  |  |  |  |
| CA_4A-29A | 4 |  |  | Yes | Yes |  |  | 20 | 0 |
|  | 29 |  | Yes | Yes | Yes |  |  |  |  |
| CA_5-12 | 5 |  |  | Yes | Yes |  |  | 20 | 0 |
|  | 12 |  |  | Yes | Yes |  |  |  |  |
| CA_5A-17A | 5 |  |  | Yes | Yes |  |  | 20 | 0 |
|  | 17 |  |  | Yes | Yes |  |  |  |  |
| CA_7A-20A | 7 |  |  | Yes | Yes | Yes |  | 30 | 0 |
|  | 20 |  |  | Yes | Yes |  |  |  |  |
| CA_8A-20A | 8 |  |  | Yes | Yes |  |  | 20 | 0 |
|  | 20 |  |  | Yes | Yes |  |  |  |  |
| CA_11A-18A | 11 |  |  | Yes | Yes |  |  | 25 | 0 |
|  | 18 |  |  | Yes | Yes | Yes |  |  |  |

NOTE 1:
The CA Configuration refers to a combination of an operating band and a CA bandwidth class (the indexing letter). Absence of a CA bandwidth class for an operating band implies support of all classes.
NOTE 2:
For each band combination, all combinations of indicated bandwidths belong to the set
NOTE 3:
For the supported CC bandwidth combinations, the CC downlink and uplink bandwidths are equal Table 1 indicates requirements for inter-band CA which are defined for CA configurations and bandwidth combination sets. In detail, CA configurations with associated bandwidth combination sets are indicated. For inter-band CA, a CA configuration is a combination of operating bands, each supporting a CA bandwidth class (e.g. class A). For each carrier aggregation configuration, requirements are specified for all bandwidth combinations contained in a bandwidth combination set, which is indicated per supported band combination in the UE radio access capability.

According to some example versions of the disclosure, the UE reconfiguration capability information is provided in connection with UE E-UTRA CA configuration information, wherein the indication may be a replacement of the letter indicating the CA bandwidth class (e.g. class A) by a corresponding small letter (i.e. "a") for indicating, for example, that the UE 10 needs a HW reconfiguration for the dedicated band. That is, when e.g. the CA configuration information indicates the CA E-UTRA CA configuration according to band 5 and band 17 (with CA bandwidth class A) (band ID number according to operational radio use case), the following options are possible for including a UE reconfiguration capability:

CA_5A-17A
CA_5a-17a
CA_5A-17a
CA_5a-17A wherein (A) indicates e.g. that the UE 10 does not need a HW reconfiguration period, while (a) indicates that the UE 10 needs a HW reconfiguration period. By means of this indication, extra signaling for providing the UE reconfiguration capability is not required.

It is to be noted that according to some example versions of the disclosure, the network scheduler, when a UE reconfiguration period is scheduled, may also alternate a communication counterpart of the respective UE (here UE 10), e.g. in case of a device-to-device communication (i.e. UE 15 of FIG. 1).

Furthermore, it is to be noted that according to some example versions of the disclosure, during UE reconfiguration period, the UE may execute a configuration for a next period.

Moreover, it is to be noted that a respective UE reconfiguration period may be different in dependence of a communication link concerned by a reconfiguration procedure. For example, the RF FE configuration period may be different for a primary component carrier (PCC) and a secondary component carrier (SCC) or alternate component carrier.

Figure 6:
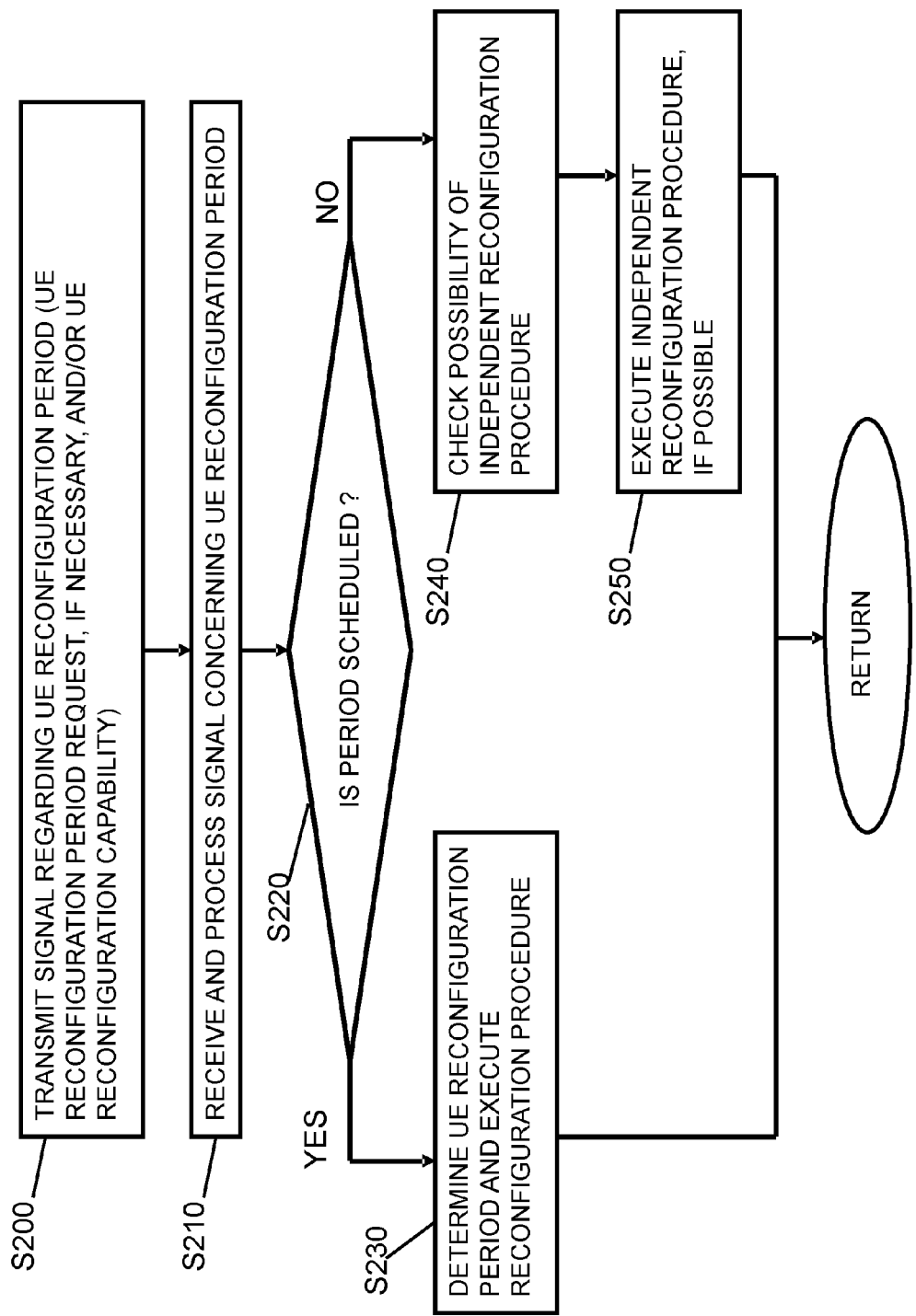
FIG. 6 shows a flowchart illustrating a processing conducted by a communication element in a mechanism usable in a reconfiguration processing according to an example version of the disclosure.

According to some example versions of the disclosure, it is possible to provide an improved mechanism for reconfiguring a transceiver system of a communication element, such as a UE. Specifically, according to some example versions of the disclosure, data corruption, blanking or unnecessary reconfiguration periods can be avoided. Example versions of the disclosure may be applied in different scenarios, e.g. in CA and multi radio use cases with unsynchronized networks. Furthermore, example versions of the disclosure may be applied in cases where a communication element, such as a UE, needs a reconfiguration period due to VCO pushing and pulling, due to antenna switch impacted discontinuity in transmission and reception, or due to RF-BB interface MUX impacted discontinuity in transmission and/or reception and/or modem initialization. Example versions of the disclosure enable to take into account UE architecture differences of present or future systems. Moreover, example versions of the disclosure avoid a network capacity lost, since the network has knowledge about whether or not a UE requires a reconfiguration period. Also, the power consumption of terminals (UEs) is improved since retransmissions are avoided, data transmission is done in shorter time, and an unnecessary inactivity period is avoided FIG. 6 shows a flowchart illustrating a processing conducted by a communication element in a mechanism usable in a reconfiguration processing according to an example version of the disclosure. The method in FIG. 6 may be executed, according to some example versions of the disclosure, in UE 10.

In S200, a transmission of a signal providing at least one information related to a requirement for a reconfiguration period (UE reconfiguration period) in which a reconfiguration procedure for reconfiguring a setting of a transceiver system is conducted. For example, the information related to the requirement for the reconfiguration period comprises a request for scheduling the reconfiguration period, and/or an indication of a UE reconfiguration capability. The transmission of the signal in S200 is based, according to some example versions of the disclosure, on a determination of a presence of a communication condition comprising at least one of a deactivation of a Scell communication, an activation or deactivation of a multi radio communication, an activation of a Pcell communication, and a CLTD mode change (i.e. a necessity for a UE reconfiguration period is detected). The indication of the UE reconfiguration capability may be sent as an alternative to the request or before the request wherein in both alternatives the UE reconfiguration capability may be embedded in a UE configuration information element related to a CA communication setting, wherein either a separate or new information element is used or present (i.e. default) information element of the UE configuration information may be varied, depending on the UE reconfiguration capability. According to some example versions of the disclosure, the UE reconfiguration capability is related to at least one of an indication that no hardware reconfiguration period is required, an indication that a hardware reconfiguration period is required, an indication that a Pcell requires a reconfiguration period, and an indication that a Scell requires a reconfiguration period. It is to be noted that during a hardware reconfiguration period also modem configurations may be executed, for example channel estimate changes for new coming configuration, modem initialization and the like.

The transmission of a signal regarding the UE reconfiguration period may further comprise, according to some example versions of the disclosure, that a required duration of a variable UE reconfiguration period is determined and a corresponding information indicating a value for the variable UE reconfiguration period is sent to the network for further processing. Alternatively, according to some example versions of the disclosure, the network sends a request (after receiving and processing the first request for the UE reconfiguration period, for example) regarding an indication of a duration of the required reconfiguration period, which is then processed and replied.

In S210, a signal is received and information comprised therein is processed, wherein the information is related to a decision whether or not a reconfiguration period is scheduled.

In S220, it is determined whether the reconfiguration period is scheduled (i.e. granted by the network). In case the reconfiguration period is scheduled (Yes in S220), S230 is executed in which a reconfiguration procedure for the transceiver system is executed on the basis of a result of the processing of the received information, i.e. on the basis of the scheduled reconfiguration period. According to some example versions of the disclosure, the signal comprising the information related to the decision whether or not a reconfiguration period is scheduled is related, when a reconfiguration period is scheduled, to one of an inactivity period measurement cap, a CPC, a DTX, a DRX, and a special purpose UE reconfiguration period. In S230, the UE reconfiguration period is then determined wherein the execution of the reconfiguration procedure for the transceiver system is done in the scheduled reconfiguration period.

Otherwise, in case the determination result in S220 is negative, i.e. there is no reconfiguration period scheduled, the processing proceeds to S240. In S240, according to some example versions of the disclosure, an independent reconfiguration procedure is prepared. The independent reconfiguration procedure is conducted independent from an externally scheduled reconfiguration period (i.e. the processing chain of S220 and S230). The preparation comprises to check whether the independent reconfiguration procedure is possible (e.g. based on a current communication link condition etc.), whereupon a scheduling of a reconfiguration period on the basis of predetermined criteria related to at least one of a communication situation (e.g. payload data situation) and a processing situation (e.g. status of running applications) is made.

In S250, the independent reconfiguration procedure for the transceiver system is executed in accordance with a processing result of S240, i.e. according to whether the independent reconfiguration procedure is possible and according to the determined reconfiguration period.

Figure 7:
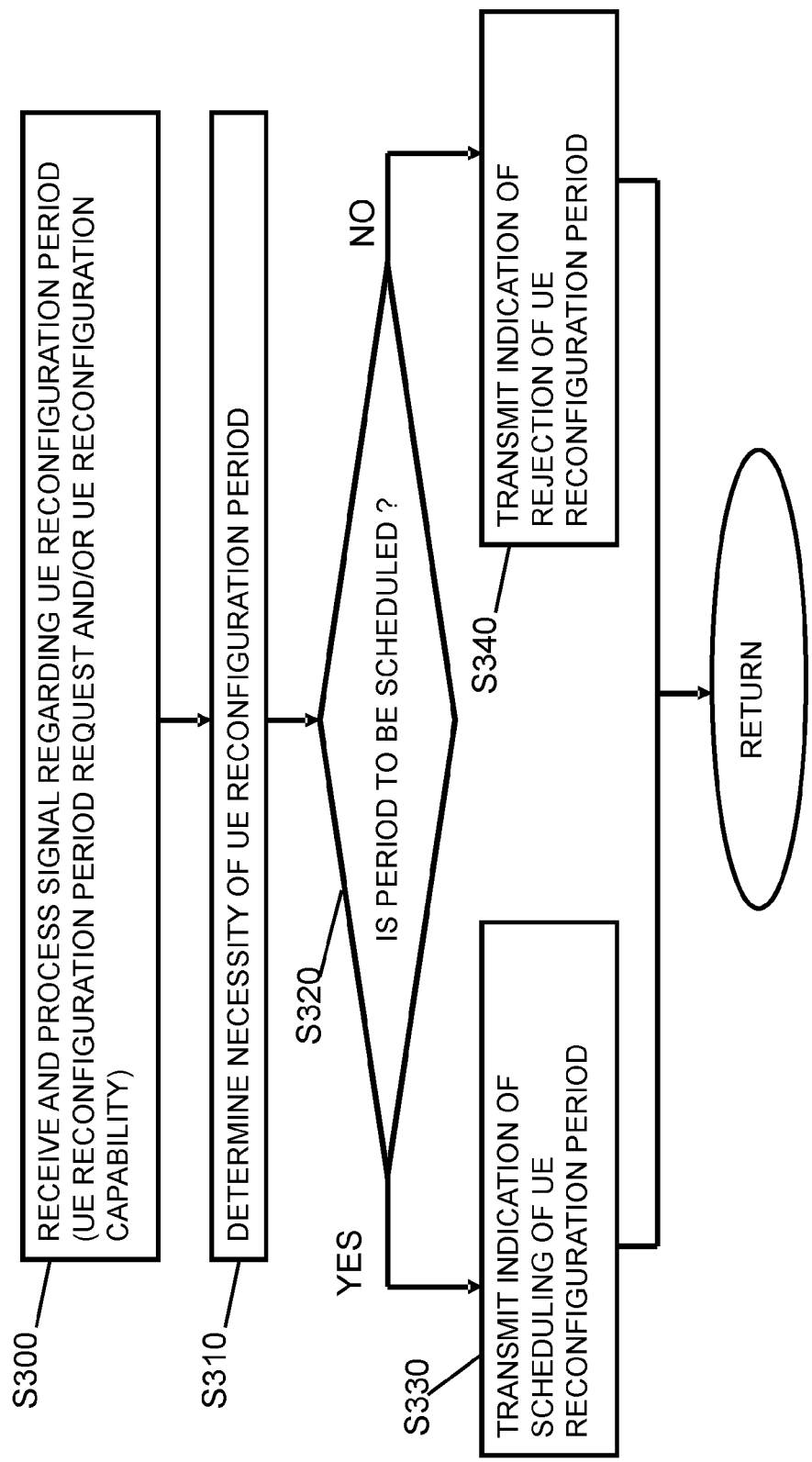
FIG. 7 shows a flowchart illustrating a processing conducted by a communication network control element in a mechanism usable in a reconfiguration processing according to an example version of the disclosure.

FIG. 7 shows a flowchart illustrating a processing conducted by a communication network control element in a mechanism usable in a reconfiguration processing according to an example version of the disclosure. The method in FIG. 7 is executed, according to some example version of the disclosure, in a communication network control element, such as the eNB 20.

In step S300, a signal providing at least one information related to a requirement for a UE reconfiguration period in which a reconfiguration procedure for reconfiguring a setting of a transceiver system is conducted is received and processed. According to some example versions of the disclosure, the information related to the requirement for the reconfiguration period is received by means of a request for scheduling the UE reconfiguration period. Alternatively or additionally, according to some example versions of the disclosure, information related to the requirement for the reconfiguration period is received by means of an indication of a UE reconfiguration capability. For example, the indication of the UE reconfiguration capability is embedded in a UE configuration information element related to a CA communication setting, may be embedded in a UE configuration information element related to a CA communication setting, wherein either a separate or new information element is used or present (i.e. default) information element of the UE configuration information may be varied, depending on the UE reconfiguration capability. According to some example versions of the disclosure, the UE reconfiguration capability is related to at least one of an indication that no hardware reconfiguration period is required, an indication that a hardware reconfiguration period is required, an indication that a Pcell requires a reconfiguration period, and an indication that a Scell requires a reconfiguration period.

The process concerning the signal regarding the UE reconfiguration period may further comprise, according to some example versions of the disclosure, in the same signal or a separate signal, an indication of a required duration of a variable UE reconfiguration period. Alternatively, according to some example versions of the disclosure, the network sends a request (after receiving and processing a signal related to the UE reconfiguration period, for example) for an indication of a duration of the required reconfiguration period, wherein a response to this request is correspondingly processed.

In S310, a necessity for a UE reconfiguration period is determined. Then, in S320, it is decided whether or not a reconfiguration period is to be scheduled. For example, according to some example versions of the disclosure, the decision of whether or not the reconfiguration period is to be scheduled is based on information related to at least one of a UE reconfiguration capability including the transceiver system, a requirement of a reconfiguration period by a Pcell, a requirement of a reconfiguration period by a Scell, a measurement of a Scell by the UE, activation, deactivation, or reconfiguration of Scell communication, activation or deactivation of a multi radio communication, activation of Pcell communication, a CLTD mode change, at least one of UL and DL MIMO mode change, antenna system change and change of terminal mechanical form factor.

In S330 and S340, based on the decision in S320, a transmission of a signal including information related to the decision of whether or not a reconfiguration period is scheduled. When the decision in S320 is positive, i.e. the UE reconfiguration period is to be scheduled, a timing for scheduling the UE reconfiguration period is determined, wherein the signal transmitted in S330 includes information related to the determined timing. According to some example versions of the disclosure, the signal including information related to a decision of whether or not the reconfiguration period is scheduled is related, when the UE reconfiguration period is scheduled, to one of an inactivity period measurement cap, a CPC, a DTX, a DRX, and a special purpose UE reconfiguration period. According to some example versions of the disclosure, a UE reconfiguration period may be set depending on a type of a communication link (e.g. different UE reconfiguration periods for PCC or SCC).

On the other hand, when the decision in S320 is negative, i.e. that the reconfiguration period is not to be scheduled, the signal transmitted in S340 comprises information related to a rejection of the reconfiguration period. Furthermore, when the decision is that the reconfiguration period is not to be scheduled, a payload period may be scheduled by the eNB 20.

Figure 8:
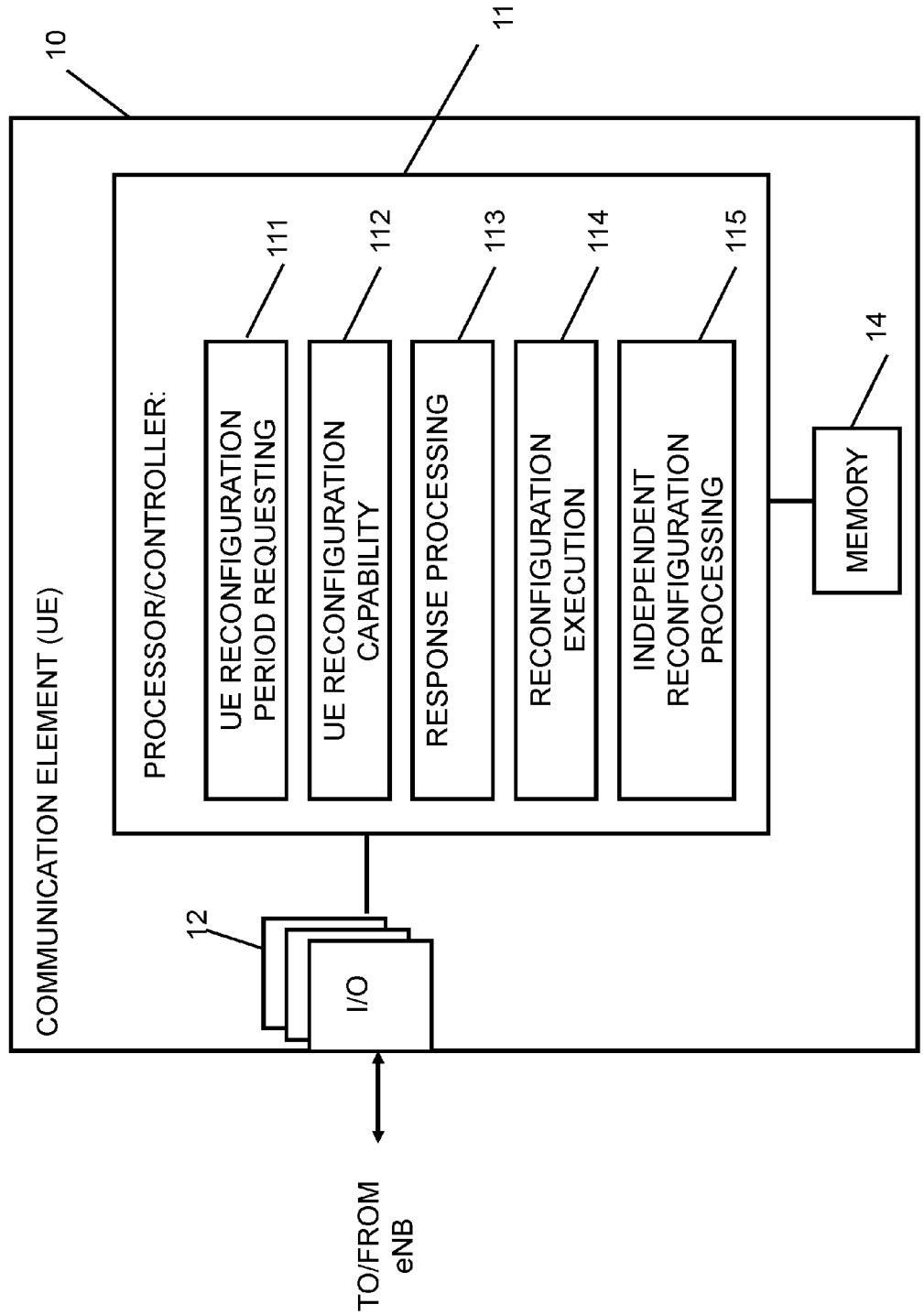
FIG. 8 shows a diagram of a communication element including processing portions conducting functions according to example versions of the disclosure.

In FIG. 8, a diagram illustrating a circuitry of a configuration of a communication element, such as the UE 10, is shown which is configured to implement the processing for conducting processing related to the reconfiguration procedure in connection with the some example versions of the disclosure. That is, a circuitry is shown which comprises at least one processor and at least one memory including a computer program code, the at least one memory and the computer program code being configured to, with the at least one processor, cause the UE 10 to perform functions described below, for example by executing a corresponding algorithm. It is to be noted that the communication element or UE 10 shown in FIG. 8 may comprise several further elements or functions besides those described herein below, which are omitted for the sake of simplicity as they are not essential for understanding example versions of the disclosure. Furthermore, even though reference is made to a terminal device or UE, the communication element may be also another device having a similar function, such as a modem chipset, a chip, a module etc., which can also be part of the UE or attached as a separate element to the UE, or the like.

According to some example versions of the disclosure, the communication element or UE 10 comprises a processing function or processor 11, such as a CPU or the like, which executes instructions given by programs or the like related to the processing concerning the reconfiguration period. The processor 11 comprises one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 12 denote transceiver or input/output (I/O) units connected to the processor 11. The I/O unit 12 is used for communicating with a communication network control element like the eNB 20. The I/O units 12 may be a combined unit comprising communication equipment towards several devices or network elements, or may comprise a distributed structure with a plurality of different interfaces for different devices or network elements. Reference sign 14 denotes a memory usable, for example, for storing data and programs to be executed by the processor 11 and/or as a working storage of the processor 11.

The processor 11 is configured to execute processing related to the above described processing concerning the reconfiguration period. In particular, the processor 11 comprises a sub-portion 111 as a processing portion which is usable as a function for requesting a UE reconfiguration period. Furthermore, the processor 11 may comprise a sub-portion 112 usable as a portion for informing about the UE reconfiguration capability. As described above, the portions 111 and 112 may be both provided, or only one of them is provided. The portions 111 and 112 are configured to perform a processing as described in connection with S200 according to FIG. 6, for example. In addition, the processor 11 comprises a sub-portion 113 usable as a portion for processing a response from the network regarding the UE reconfiguration period. The portion 113 is configured to perform a processing as described in connection with S210 according to FIG. 6, for example. Furthermore, the processor 11 comprises a sub-portion 114 usable as a processing portion for conducting a reconfiguration processing. The portion 114 is configured to perform a processing as described in connection with S230 according to FIG. 6, for example. Moreover, the processor 11 comprises a sub-portion 115 usable as a processing portion for conducting an independent reconfiguration procedure. The portion 115 is configured to perform a processing as described in connection with S240 and S250 according to FIG. 6, for example.

Figure 9:
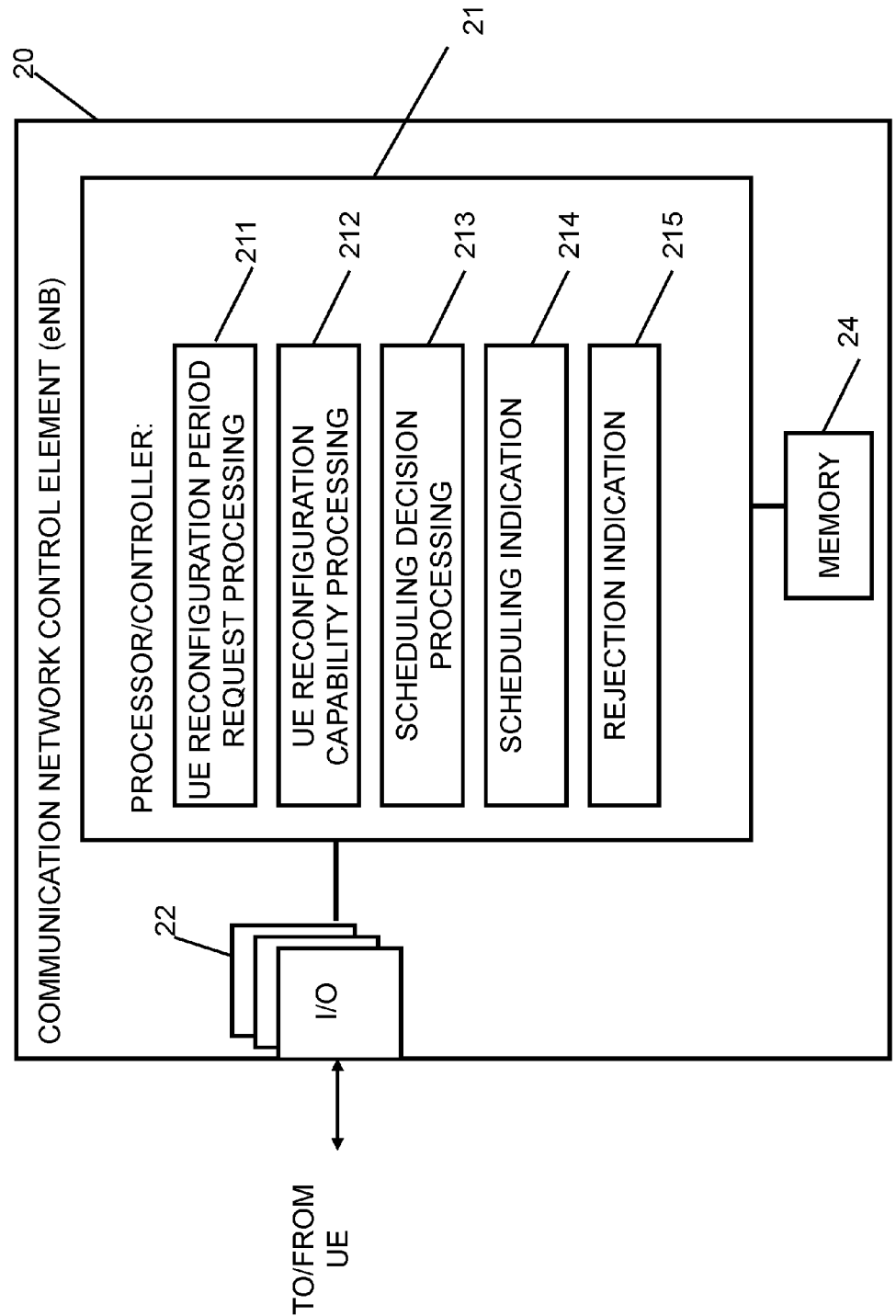
FIG. 9 shows a diagram of a communication network control element including processing portions conducting functions according to example versions of the disclosure.

In FIG. 9, a diagram illustrating a circuitry of a configuration of a communication network control element, such as the eNB 20, is shown which is configured to implement the processing concerning the reconfiguration period as described in connection with the some example versions of the disclosure. That is, a circuitry is shown which comprises at least one processor and at least one memory including a computer program code, the at least one memory and the computer program code being configured to, with the at least one processor, cause the eNB 20 to perform functions described below, for example by executing a corresponding algorithm. It is to be noted that the communication network control element or eNB 20 shown in FIG. 9 may comprise several further elements or functions besides those described herein below, which are omitted for the sake of simplicity as they are not essential for understanding example versions of the disclosure. Furthermore, even though reference is made to an eNB, the communication network control element may be also another device having a similar function, such as a modem chipset, a chip, a module etc., which can also be part of a base station or eNB or attached as a separate element to a base station or eNB, or the like.

According to some example versions of the disclosure, the communication network control element or eNB 20 comprises a processing function or processor 21, such as a CPU or the like, which executes instructions given by programs or the like related to the processing concerning the reconfiguration period. The processor 21 comprises one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 22 denotes transceiver or input/output (I/O) units connected to the processor 21. The I/O units 22 are used for communicating with a communication element like the UE 10. The I/O units 22 may be a combined unit comprising communication equipment towards several devices or network elements, or may comprise a distributed structure with a plurality of different interfaces for different devices or network elements. Reference sign 24 denotes a memory usable, for example, for storing data and programs to be executed by the processor 21 and/or as a working storage of the processor 21.

The processor 21 is configured to execute processing related to the above described processing concerning the reconfiguration period. In particular, the processor 21 comprises a sub-portion 211 as a processing portion which is usable as a function for processing a request for a UE reconfiguration period. Furthermore, the processor 21 may comprise a sub-portion 212 usable as a portion for processing a UE reconfiguration capability. As described above, the portions 211 and 212 may be both provided, or only one of them is provided. The portions 211 and 212 are configured to perform a processing as described in connection with S300 according to FIG. 7, for example. In addition, the processor 21 comprises a sub-portion 213 usable as a portion for deciding on scheduling of the UE reconfiguration period. The portion 213 is configured to perform a processing as described in connection with S310 and S320 according to FIG. 7, for example. Furthermore, the processor 21 comprises a sub-portion 214 usable as a processing portion for providing a scheduling indication. The portion 214 is configured to perform a processing as described in connection with S330 according to FIG. 7, for example. Moreover, the processor 21 comprises a sub-portion 215 usable as a processing portion for providing a rejection of the UE reconfiguration period. The portion 215 is configured to perform a processing as described in connection with S340 according to FIG. 7, for example.

According to some example versions of the disclosure, the (re-) configuration period being adjustable by a processing as discussed above can be variable, i.e. different reasons for the necessity for a UE reconfiguration period (as discussed e.g. in connection with S10 in FIG. 4) may lead to different length of the requested UE reconfiguration period.

For example, according to some example versions of the disclosure, in case of communication devices having a related form factor (for example considered in some operational use case for an LTE non-CA or LTE-A CA device) only a main antenna is galvanically connected while one or more secondary antenna may be galvanically disconnected, or a secondary antenna is be covered by mechanics which degrades antenna radiation performance. This may be used, for example, for achieving smaller size for certain basic radio communication operations.

Another example version of the disclosure may be related to a device (eNB, UE) where specific antenna configurations are provided for future MIMO classes, for example 4 antennas when an UE implements a 4RX reception mode, or even 8 antenna devices.

Advantage is, for example, that antennas may be unconnected in certain mechanical form factors. By means of this, a mechanical form factor (size or the like) may be smaller, e.g. in a situation where less antennas are to be operational. Furthermore, a radiation performance of the remaining connected antennas can be improved when antennas being not required are disconnected (mutual coupling between antennas is decreased). This improves remaining antennas radiation performance.

In the above examples, when increasing the number of operational antennas, for example, a user may be forced to alter a (mechanical) form factor of the UE or to alter use case conditions (e.g. when a CA antenna or 4RX or 8RX antenna configuration has to be made operational). However, the network controller does probably have no information in this regard, i.e. which kind of mechanical form factor/antenna configuration the UE is provided with when the network commands, for example, a new MIMO class requiring reconfiguration on the UE side. That is, by using example versions of the disclosure as described above, for example, the UE is able to request a sufficient period of time for the UE reconfiguration period in order to enable the UE to be operational in a new mode.

For example, in case an antenna configuration is to be altered by the user or by an internal actor, such as a servo motor of the device, a longer time can be requested compared to a case where only switches are to be changed. According to some further examples versions of the disclosure, the requested time may be set to a very long time, wherein according to some additional examples versions of the disclosure, the time may be interrupted e.g. by a transmission of a confirmation message or the like from the UE to the network scheduler when an antenna configuration is determined to be completed.

Also in implementation examples where a multiple RX device, such as a 4RX operational LTE-A communication device or the like is employed, a certain configuration period may be requested which depends on the time needed for a transition between main and diversity reception to a 4RX reception, for example, in case of RF-BB interfaces which need to be multiplexed in a transition between the respective configurations. This may lead to a requirement to re-initialize modem branches.

When implementing a processing according to example versions of the disclosure, it is possible to consider a case where an UE does not need a reconfiguration period. In this case, a reconfiguration period is not requested for that dedicated UE, which saves network resources. In other words, by using the processing for varying a reconfiguration period, waste of network resources can be avoided.

Furthermore, according to an example version of the disclosure, there is provided, for example, an apparatus comprising processing means for causing transmission of a signal providing at least one information related to a requirement for a reconfiguration period in which a reconfiguration procedure for reconfiguring a setting of a transceiver system is conducted, processing means for receiving and processing a signal comprising information related to a decision whether or not a reconfiguration period is scheduled, and processing means for executing a reconfiguration procedure for the transceiver system on the basis of a result of the processing of the received information.

Furthermore, according to an example version of the disclosure, there is provided, for example, an apparatus comprising processing means for receiving and processing a signal providing at least one information related to a requirement for a reconfiguration period in which a reconfiguration procedure for reconfiguring a setting of a transceiver system is conducted, processing means for deciding whether or not a reconfiguration period is to be scheduled, and processing means for causing a transmission of a signal including information related to the decision of whether or not a reconfiguration period is scheduled.

For the purpose of the some embodiments of the present invention as described herein above, it should be noted that:
  an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable communication networks and transmission nodes may be or comprise any device, apparatus, unit or means by which a station, entity or other user equipment may connect to and/or utilize services offered by the access network; such services include, among others, data and/or (audio-) visual communication, data download etc.;

a user equipment or communication network element may be any device, apparatus, unit or means which is usable as a user communication device and by which a system user or subscriber may experience services from an access network, such as a mobile phone, a wireless mobile terminal, a personal digital assistant PDA, a smart phone, a personal computer (PC), a laptop computer, a desktop computer or a device having a corresponding functionality, such as a modem chipset, a chip, a module etc., which can also be part of a UE or attached as a separate element to a UE, or the like, wherein corresponding devices or terminals may be, for example, an LTE, an LTE-A, a TETRA (Terrestrial Trunked Radio), an UMTS, a GSM/EDGE etc. smart mobile terminal or the like;

method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), graphene, BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved; for example, for executing operations and functions according to examples of embodiments of the invention, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Furthermore, as used in this application, the terms 'device' or 'circuitry' refer to all of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory (or memories) working together to cause an apparatus, such as a mobile phone or server, to perform various functions) and (c) circuits, such as a microprocessor (or plural microprocessors) or a portion of a microprocessor (or plural microprocessors), that requires/require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Although the present invention has been described hereinbefore with reference to particular embodiments thereof, the present invention is not limited thereto and various modifications can be made thereto.

What is claimed is:

1. An apparatus, comprising:
    circuitry of user equipment, the circuitry configured to
        transmit, to a base station, reconfiguration information based on a capability of the user equipment and a closed loop transmit diversity (CLTD) mode change, the reconfiguration information indicating a requirement for a reconfiguration period in which settings of transceiver circuits of the user equipment are reconfigured;
        receive, from the base station, command information that indicates whether the reconfiguration period is scheduled by the base station;
        determine, based on the command information received from the base station, whether the reconfiguration period is scheduled by the base station;
        execute, when the reconfiguration period is scheduled by the base station, a reconfiguration procedure to reconfigure the settings based on the command information; and
        execute, when the reconfiguration period is not scheduled by the base station, an independent reconfiguration procedure to reconfigure the settings based on the command information and a communication condition of the user equipment.

2. The apparatus according to claim 1, wherein the reconfiguration information comprises a request for scheduling the reconfiguration period.

3. The apparatus according to claim 2, wherein
    the circuitry is further configured to determine a presence of the communication condition,
    the communication condition comprising at least one of activation, deactivation, or reconfiguration of a secondary cell communication, activation or deactivation of a multi radio communication, activation of a primary cell communication, a closed loop transmit diversity mode change, at least one of uplink and downlink multiple input multiple output mode change, antenna system change and change of terminal mechanical form factor, and
    the request for scheduling the reconfiguration period is triggered when the communication condition is determined to be present.

4. The apparatus according to claim 1, wherein the reconfiguration information comprises an indication of a reconfiguration capability.

5. The apparatus according to claim 4, wherein the indication of the reconfiguration capability is embedded in a configuration information element related to a carrier aggregation communication setting as one of a new information element or a variation of a default information element.

6. The apparatus according to claim 1, wherein the circuitry is further configured to
    determine a required duration of the reconfiguration period, and
    transmit an indication of the determined duration of the reconfiguration period.

7. The apparatus according to claim 1, wherein the circuitry is further configured to
    transmit, to the base station, a request for an indication of a duration of a required reconfiguration period, and
    receive, from the base station, a response that indicates the duration of the required reconfiguration period.

8. The apparatus according to claim 1, wherein the command information is related, when the reconfiguration period is scheduled by the base station, to one of an inactivity period measurement cap, a continuous packet continuity, a discontinuous transmission, a discontinuous reception, and a special purpose reconfiguration period.

9. The apparatus according to claim 1, wherein when the reconfiguration period is scheduled, the circuitry executes the reconfiguration procedure in the scheduled reconfiguration period.

10. The apparatus according to claim 1, wherein the circuitry transmits the reconfiguration information based on a presence of the communication condition comprising at least one of a deactivation of a Scell communication, an activation or deactivation of a Multi radio communication, an activation of a Pcell communication, and the CLTD mode change.

11. A method, comprising:
    transmitting to a base station, by circuitry of user equipment, reconfiguration information based on a capability of the user equipment and a closed loop transmit diversity (CLTD) mode change, the reconfiguration information indicating a requirement for a reconfiguration period in which settings of transceiver circuits of the user equipment are reconfigured;

receiving, from the base station, command information that indicates whether the reconfiguration period is scheduled by the base station;

determining, by the circuitry and based on the command information received from the base station, whether the reconfiguration period is scheduled by the base station;

executing, by the circuitry when the reconfiguration period is scheduled by the base station, a reconfiguration procedure to reconfigure the settings based on the command information; and execute, by the circuitry when the reconfiguration period is not scheduled by the base station, an independent reconfiguration procedure to reconfigure the settings based on the command information and a communication condition of the user equipment.

12. An apparatus, comprising:
circuitry of a base station, the circuitry configured to
receive, from user equipment, reconfiguration information based on a capability of the user equipment and a closed loop transmit diversity (CLTD) mode change, the reconfiguration information indicating a requirement for a reconfiguration period in which settings of transceiver circuits of the user equipment are reconfigured;

determine, based on the reconfiguration information, whether a reconfiguration period is to be scheduled by the base station;

schedule the reconfiguration period when the reconfiguration period is determined by the circuitry to be scheduled; and transmit, to the user equipment, command information that indicates whether the reconfiguration period is scheduled by the base station, wherein the user equipment executes, when the reconfiguration period is scheduled by the base station, a reconfiguration procedure to reconfigure the settings based on the command information, and the user equipment executes, when the reconfiguration period is not scheduled by the base station, an independent reconfiguration procedure to reconfigure the settings based on the command information and a communication condition of the user equipment.

13. The apparatus according to claim 12, wherein the reconfiguration information comprises a request for scheduling the reconfiguration period.

14. The apparatus according to claim 12, wherein the reconfiguration information comprises an indication of a reconfiguration capability.

15. The apparatus according to claim 14, wherein the indication of the reconfiguration capability is embedded in a configuration information element related to a carrier aggregation communication setting as one of a new information element or a variation of a default information element.

16. The apparatus according to claim 14, wherein the indication of the reconfiguration capability is includes at least one of
an indication that a hardware reconfiguration period is not required,
an indication that the hardware reconfiguration period is required,
an indication that a primary cell requires a reconfiguration period, and
an indication that a secondary cell requires a reconfiguration period.

17. The apparatus according to claim 12, wherein the circuitry is further configured to receive and process an indication of a required duration of the reconfiguration period.

18. The apparatus according to claim 12, wherein the circuitry is further configured to
receive, from the user equipment, a request for an indication of a duration of a required reconfiguration period,
determine the duration of the required reconfiguration period, and
transmit, to the user equipment, a response that indicates the duration of the required reconfiguration period.

19. The apparatus according to claim 12, wherein the command information further includes at least one of
a reconfiguration capability of a communication element including the base station,
a requirement of the reconfiguration period by a primary cell,
a requirement of the reconfiguration period by a secondary cell,
a measurement of the secondary cell by the communication element,
activation, deactivation, or reconfiguration of secondary cell communication,
activation or deactivation of a multi radio communication,
activation of a primary cell communication,
a closed loop transmit diversity mode change, and
at least one of uplink and downlink multiple input multiple output (MIMO) mode change, an antenna system change, and a change of terminal mechanical form factor.

20. The apparatus according to claim 12, wherein
the circuitry is further configured to determine, when the reconfiguration period is to be scheduled, a timing for scheduling the reconfiguration period, and
the command information further comprises information related to the timing.

* * * * *